United States Patent
Schroeder (10) Patent No.: US 11,106,449 B2
(45) Date of Patent: Aug. 31, 2021

(54) METHOD FOR UPDATING SOFTWARE COMPONENTS OF A NETWORK SUBSCRIBER OF A NETWORK

(71) Applicant: Robert Bosch GmbH, Stuttgart (DE)

(72) Inventor: Thomas Schroeder, Triefenstein (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 16/156,011

(22) Filed: Oct. 10, 2018

(65) Prior Publication Data
US 2019/0129707 A1 May 2, 2019

(30) Foreign Application Priority Data
Oct. 26, 2017 (DE) ...................... 10 2017 219 188.0

(51) Int. Cl.
*G06F 8/65* (2018.01)
*H04L 29/08* (2006.01)

(52) U.S. Cl.
CPC ................ *G06F 8/65* (2013.01); *H04L 67/34* (2013.01)

(58) Field of Classification Search
CPC . H04L 67/34; H04L 67/12; G06F 8/61; G06F 8/65
See application file for complete search history.

(56) References Cited

U.S. PATENT DOCUMENTS

| | | | | |
|---|---|---|---|---|
| 9,158,526 B1* | 10/2015 | Nguyen | .................. | H04L 41/08 |
| 9,256,424 B1* | 2/2016 | Kuchibhotla | ............. | G06F 8/71 |
| 9,923,881 B2* | 3/2018 | Smith | ....................... | H04L 9/14 |
| 10,389,756 B2* | 8/2019 | Smith | ................. | H04L 63/1425 |
| 10,701,084 B2* | 6/2020 | Surdu | ................... | G06F 21/105 |
| 2002/0188934 A1* | 12/2002 | Griffioen | .................... | G06F 8/65 717/170 |
| 2004/0133626 A1* | 7/2004 | Herrero | ............... | H04L 63/0272 709/200 |
| 2005/0125489 A1* | 6/2005 | Hanes | ...................... | G06F 8/60 709/202 |

(Continued)

OTHER PUBLICATIONS

"Hou etal ); "Design and implementation of application programming interface for internet of things cloud", 16 pages"; Jun. 27, 2016 (Year: 2016).*

*Primary Examiner* — Wei Y Zhen
*Assistant Examiner* — Brahim Bourzik
(74) *Attorney, Agent, or Firm* — Maginot, Moore & Beck LLP (57) ABSTRACT

A method for updating software components of a network subscriber of a network, in which a program code of the network subscriber has at least two manufacturer-specific blocks, and each of these manufacturer-specific blocks has at least one software component. Each manufacturer-specific block has a respective associated block field, the at least one software component of each manufacturer-specific block has a respective associated component field, and at least one of the block fields and/or at least one of the component fields stores a respective address of a source responsible for an update. An address of the source responsible for the update of the at least one software component is selected for the at least one software component of each manufacturer-specific block on the basis of the component field associated with this at least one software component and the block field associated with this respective manufacturer-specific block.

12 Claims, 3 Drawing Sheets

(56) References Cited

U.S. PATENT DOCUMENTS

| | | | |
|---|---|---|---|
| 2011/0307712 A1* | 12/2011 | Sakthikumar | G06F 21/572 |
| | | | 713/189 |
| 2014/0189675 A1* | 7/2014 | Cheng | G06F 8/61 |
| | | | 717/170 |
| 2015/0249672 A1* | 9/2015 | Burns | G06F 21/629 |
| | | | 726/4 |
| 2017/0257341 A1* | 9/2017 | Arsenault | H04W 4/70 |
| 2017/0322790 A1* | 11/2017 | Surdu | G06F 8/654 |
| 2018/0077012 A1* | 3/2018 | Tellado | H04L 43/10 |
| 2018/0165088 A1* | 6/2018 | Bonar | H04L 67/34 |
| 2019/0104415 A1* | 4/2019 | Gehrmann | H04W 12/0023 |
| 2019/0171438 A1* | 6/2019 | Franchitti | G06F 16/9538 |

* cited by examiner

METHOD FOR UPDATING SOFTWARE COMPONENTS OF A NETWORK SUBSCRIBER OF A NETWORK

This application claims priority under 35 U.S.C. § 119 to patent application no. DE 10 2017 219 188.0, filed on Oct. 26, 2017 in Germany, the disclosure of which is incorporated herein by reference in its entirety.

The disclosure relates to a method for updating software components of a network subscriber of a network.

BACKGROUND

For the networking of machines, for example in the field of automation engineering, the term "Industry 4.0" is now common. This is intended to be understood to mean the networking of machines or installations and in particular also the connection of said machines or installations to the Internet or the Internet of Things (known as IoT). Networked devices in this context may be sensors and security cameras through to vehicles and production machines. Since such IoT devices networked to one another are typically connected to the Internet, it is necessary to ensure that program code executed on the IoT devices is regularly subjected to security updates and is up to date so as not to be susceptible to attacks.

Program code executed on such IoT devices can often be made up of a multiplicity of individual software components that have been produced by an original manufacturer and possibly by a multiplicity of original equipment manufacturers or OEMs.

In this context, an original manufacturer can initially produce a piece of basic software and an appropriate platform. A further manufacturer, in particular a first OEM, can obtain this basic software and this platform from the original manufacturer, extend them with its own software components and therefore produce a first extended version of the program code. A further manufacturer, in particular a second OEM, can in turn obtain this first extended version of the program code from the first OEM, in turn extend it with its own software components and in so doing produce a second extended version of the program code. This cascade can be continued until a final n-th manufacturer or OEM produces an n-th extended final version of the program code that is ultimately put onto the IoT device and executed thereby.

Updates of such program codes can prove very complex, however. If, by way of example, the original manufacturer spots a security-critical error in its basic software, it produces an update for its basic software, for example, in which this error is corrected. The first OEM is for the most part informed about this update, for example by means of a trigger. The first OEM then incorporates this update into its version of the program code and produces an updated version of this first extended program code. The second OEM is in turn informed about this update, incorporates it into its version of the program code and therefore produces an updated version of its second extended program code. This cascade also continues as far as the final OEM, which eventually publishes an updated version of the final program code.

Thus, until this updated final program code is ultimately executed on the IoT device, a long period of time may elapse, since each individual manufacturer involved needs to update its specifically extended program code. During this period of time, the respective IoT device may be susceptible to attacks.

SUMMARY

According to the disclosure, a method for updating software components of a network subscriber of a network and a computation unit for performing said method having the features of the independent patent claims are proposed. Advantageous configurations are the subject matter of the subclaims and of the description below.

The disclosure in particular provides the option of automatically updating multiple and preferably all of the software components of the network subscriber if need be also from different sources automatically. The individual software components in this case have associated "block fields" and "component fields" that store addresses of sources with the aid of which the update of the individual software components is performable automatically.

A program code of the network subscriber has at least two manufacturer-specific blocks for software components. Each of these manufacturer-specific blocks has at least one software component. A manufacturer-specific block of this kind is in particular an individual area or individual slots in which the software components of a respective specific manufacturer are combined. In particular, a specific manufacturer or OEM cannot alter any of the other manufacturer-specific blocks not provided for it. In other words, different manufacturers involved in the program code thus each have a block or area of their own for denoting or describing their own software components. How the components are physically stored and interact is not relevant at this juncture. In particular, the software components of a manufacturer do not physically have to be in a common memory area.

Each manufacturer-specific block has a respective associated block field. The at least one software component of each manufacturer-specific block has a respective associated component field. Such a block field or such a component field can be used by the manufacturers to store in particular information describing the respective associated manufacturer-specific block or the respective associated software component. Such a block field, in particular information stored in such a block field, expediently applies to all of the software components of this block. Such a component field, in particular information stored in such a component field, in particular applies only to the respective associated software component. It should be pointed out that block fields and/or component fields may also be empty and may contain no information. The block fields or component field can in particular each be regarded as digital labels or digital type plates providing information about the associated block or the associated software component.

At least one of the block fields and/or at least one of the component fields stores a respective address of a source responsible for an update. In this case, such a source is responsible in particular for the update of one or more software components. Such a source may in particular be a further network subscriber of the network, for example a server or a distributed system of computation units (what is known as a cloud). It goes without saying that the individual block fields and individual component fields may expediently each store the same address of the same source or may expediently each also store different addresses of different sources.

When a manufacturer introduces one or more software components into its associated block, it expediently uses the respective block field and/or the component fields to store respective applicable addresses and therefore in particular indicates the source(s) responsible for the update of the software components it has introduced.

To perform the update of the software components, the method involves an address of the source responsible for the update of the at least one software component being selected for the at least one software component of each manufacturer-specific block in each case on the basis of the component field associated with this at least one software component and the block field associated with this respective manufacturer-specific block. The update of the at least one software component is performed with the aid of the selected source.

An address stored in a block field, which is subsequently also referred to as a slot address or block-specific address, applies in particular to all of the software components of this block. An address stored in a component field, which is subsequently also referred to as a component address or component-specific address, applies in particular only to the software component associated with this component field.

If the component field of a software component does not store a component address, in particular the slot address stored in the block field of the respective block is selected for this software component. Expediently, component addresses can have greater relevance than slot addresses, i.e. if the component field of a software component stores a component address and if the block field of the respective block of this software component also stores a slot address then in particular the component address is selected for this software component.

Alternatively, it is also expedient that slot addresses have greater relevance than component addresses. If a slot address is stored in a block field in this case then said slot address is in particular selected for all software components of this block, even if one software component may have an associated component address that differs from the slot address. If an update is not available for a software component at this selected slot address in this case, it is expediently possible to contact the component address stored in the component field of this software component.

Expediently, it is possible to prescribe for each individual block and/or for all blocks together which of the options explained above is intended to be taken as a basis for selecting addresses, that is to say in particular whether the component addresses or the slot addresses have greater relevance.

After the applicable address of the respective source has been selected, this source is contacted, in particular, and a secure connection (preferably secured by means of standard encryption methods, such as e.g. https) is expediently set up from the network subscriber to the source. A check is performed to determine whether there is an update for the software component, in particular for the current version of the software component. If an update is available then it is performed, in particular.

The method provides an option for performing an effective and fast update of software components of the program code. Since in particular each software component has a source indicated for it that is responsible for its update, in the block field and/or the component field, it is expediently possible for an update of all of the software components to be performed automatically in a simple manner.

As mentioned at the outset, the manufacturers involved in a program code conventionally just introduce software components into the program code without said software components being provided with information for subsequent updates. Conventionally, each manufacturer involved individually performs an applicable update of its specifically extended program code, which update then continues to be used by the superordinate manufacturer. By contrast, the present method can perform an automatic update of all of the software components.

The disclosure in particular provides a platform by means of which manufacturers that are involved can stipulate how the update of their software components is performed. Using the block and component fields, the applicable manufacturer can describe its software components introduced into the program code adequately, so that they are adequately classified for the update.

The stored addresses can prescribe the source from which updates of the respective software components need to be obtained. If e.g. a manufacturer introduces a software component into the program code and later on itself performs updates for said software component, for example because the manufacturer itself operates an update server or provides updates via a cloud, then said manufacturer can prescribe this in the respective block field or component field as appropriate. If another manufacturer wants to perform an update, this may analogously be prescribed in its respective block field or component field.

By way of example, the prevailing situation may also be that a manufacturer does not produce a software component itself, for example, but rather obtains it from a supplier and only introduces this software component into the program code. If the supplier performs the updates of this software component later on, the manufacturer can define this in the respective block field or component field by means of an applicable address of the supplier source.

According to an advantageous embodiment, software components are introduced into the program code in the course of a manufacturing process. This manufacturing process takes place in particular at a first time, in particular before the program code is introduced into the network subscriber and executed thereby. In the course of this manufacturing process the program code can be produced in particular by a more original manufacturer, that is to say it is in particular possible for a piece of basic software and/or an applicable platform to be produced by the more original manufacturer. Similarly, it is conceivable that an already existing executable program code is extended in the course of the manufacturing process. A further manufacturer can in this case perform an extension of a program code, for example, that it has obtained directly from the original manufacturer of the program code or from a different, further manufacturer, for example.

The method steps of selecting the address and performing the update take place in particular after this manufacturing process, in particular after the program code has been introduced into the network subscriber, more particularly after the network subscriber has been introduced into the applicable network and more particularly when the program code is executed by the network subscriber. In particular, these method steps of selecting the address and performing the update are performed at a second time, which is chronologically after the first time. Precisely when this second time takes place can be stipulated in particular during the manufacturing process at the first time. By way of example, the second time can be prescribed by an interval of time after which, when it has elapsed, updates are intended to be sought.

Advantageously, in the course of this manufacturing process a manufacturer uses the block field of its manufacturer-specific block and/or uses at least one of the component fields of its manufacturer-specific block to store the respective address of the source responsible for the update.

If the original manufacturer produces the program code in the course of this manufacturing process then this at least one software component may also be the first software component or one of the first software components that is introduced into the program code, for example. If a further manufacturer extends the program code in the course of this manufacturing process, for example, then there may already be a multiplicity of further software components implemented in the program code by the original manufacturer and possibly by other manufacturers.

When introducing its software components in the course of the manufacturing process, the respective manufacturer can therefore associate component addresses or slot addresses with each software component of its block or of its slot. In particular, the respective manufacturer therefore already prescribes in the manufacturing process which source(s) perform(s) the update of the software components introduced by said manufacturer during later regular operation of the program code. In particular, a source responsible for the later update is therefore prescribed for each software component of the program code by the respective manufacturer/OEM in the course of the actual manufacturing process. As explained earlier on, the present method therefore provides a platform by means of which manufacturers can stipulate during the actual manufacturing process how the update of their software components is meant to be performed during later operation.

According to a particularly advantageous configuration of the disclosure, the option is provided for a manufacturer to introduce new software components into the program code in the course of the manufacturing process and to perform both the update of these software components and the update of other software components, already present in the program code (i.e. that is to say underlying or subordinate software components), from other manufacturers. For this purpose, this manufacturer can use the block fields of already present, i.e. that is to say alien, manufacturer-specific blocks to store addresses of sources responsible for the update. In particular, a subordinate manufacturer can thus also provide updates for subordinate software components (e.g. drivers, operating system components) on demand.

The alien block fields may already store other addresses from a subordinate manufacturer that are then overwritten or even erased. When an address of an alien block is erased, for example, and the applicable block field of this block is therefore empty, this alien, subordinate block can in particular have an address selected for it that is stored in the block field of the subordinate block.

As explained, the block fields or the component field may each also be empty and contain no information. If a component field does not contain an address then the associated block field can provide the address. If a block field does not contain an address then a block field of a superordinate block can provide an address. In particular, a flexible option is therefore obtained for storing different addresses for software components, as explained below.

According to a preferred embodiment, the component addresses can have greater relevance than the slot addresses. If the component field associated with the at least one software component of a respective manufacturer-specific block stores an address then advantageously this address is selected for the update of the at least one software component, and the update of the at least one software component is performed with the aid of this selected source. A component address is therefore selected for a software component if said component address is available, in particular even if the block field of the applicable block stores a slot address that is possibly different from the available component address. In this case, the slot address applies in particular to software components that do not have an associated component address.

If the component field associated with the at least one software component of a respective manufacturer-specific block does not store an address then advantageously the address stored in the block field associated with this respective manufacturer-specific block is selected for the update of this at least one software component, and the update of the at least one software component is performed with the aid of this selected source. As explained above, in this case the slot address applies in particular to software components that do not have an associated component address.

By way of example, this can allow a manufacturer to introduce a multiplicity of software components into its block and different sources to be responsible for the update of these introduced software components. If a manufacturer introduces a multiplicity of software components into the program code, for example, in the course of the manufacturing process and performs the update for all of these software components then this manufacturer can store no address in the individual component fields of these software components, for example, but rather can store the respective address in the block field of its block. Therefore, this address in the block field is expediently selected for all software components in this block. Alternatively, the manufacturer can also store the same address in each component field in this multiplicity of software components and no address in the block field.

By way of example, a manufacturer can introduce its own software components, which this manufacturer itself has produced, and alien software components, which are obtained from a supplier, into the program code in the course of the manufacturing process. This manufacturer can e.g. itself undertake the update for its own software components and accordingly stores that update in the component fields of these software components of its own. If the manufacturer does not undertake the update of the alien software components, but rather the supplier, for example, then the manufacturer can accordingly store said update in the component fields of these alien software components. By way of example, the manufacturer can for this purpose store the address of the respective servers or of the respective clouds in the respective component fields.

Alternatively, it is also conceivable in this case for the manufacturer to store no address in the component fields of those software components whose update it undertakes itself and instead to use the block field of its block to store the address of that source that is responsible for the update of these software components. The component fields of the alien software components of the supplier, which also undertakes the update, can be used by the manufacturer in this case to store the respective addresses of the source of the supplier.

According to a further preferred embodiment, the slot addresses may also have greater relevance than the component addresses. If the block field of a respective manufacturer-specific block stores an address then advantageously this address is selected for the update of the at least one software component of this respective manufacturer-specific block, and the update of the at least one software component is performed with the aid of this selected source. When a slot address of a block is available, it is in particular selected for all software components of this block, even if component fields may in this case store component addresses that may differ from this slot address.

If an update is not available for a software component at this selected slot address, however, then preferably the component address stored in the component field of this software component can be selected. If an update is not available for the at least one software component at the selected address stored in the block field of the respective manufacturer-specific block then advantageously the address stored in the component field associated with the at least one software component is selected for the update of the at least one software component, and the update of the at least one software component is preferably performed with the aid of this selected source. Preferably, it is prescribed for each individual block and/or for all blocks together, in particular in the course of the manufacturing process, how the addresses are selected and whether the component addresses or the slot addresses have greater relevance. Alternatively or additionally, this is a freely configurable—even during operation—selection that is alterable in particular in the course of updates.

According to a preferred embodiment, the component fields associated with the at least one software component each store update-specific information. This update-specific information is needed in particular for performing the update. A component field may therefore expediently store different information at the same time, in particular the component address and update-specific information of this kind. By way of example, a component field can comprise different entries for this purpose. It is also conceivable for the software components to be respectively assigned two or more independent component fields, the first of these component fields being able to be used to store an applicable address and a second component field being able to be used to store applicable update-specific information.

Advantageously, the component fields associated with the at least one software component each store information about a current version of this at least one software component as update-specific information. In particular, this update-specific information can comprise a unique identifier of the respective software component, e.g. a GUID (globally unique identifier). Expediently, this update-specific information is semantic information and has a semantic, that is to say an inherently self-explanatory, significance for the manufacturer. By way of example, the update-specific information can describe a version and/or a version number of the respective software component.

Preferably, the update of the at least one software component is performed with the aid of the selected source on the basis of the update-specific information stored in the component field of the at least one software component. Expediently, the update-specific information is transmitted from the network subscriber to the selected source for this purpose, said source then in particular checking whether there is an update for this version of the software component.

Advantageously, the update is performed for all software components consecutively or in cascaded fashion, in particular according to a prescribed order. Preferably, the address of the source responsible for the update of the respective software component is selected for each software component, beginning with a hierarchically highest software component down to a hierarchically lowest software component, in each case on the basis of the component field associated with the respective software component and the block field associated with this respective manufacturer-specific block, and the update of the respective software component is performed with the aid of the selected source. The hierarchically highest software component is in particular a latest software component, or a software component most recently introduced into the program code, e.g. a user program. The hierarchically lowest software component is in particular an oldest software component, or a software component introduced first, e.g. an operating system.

In particular, the respective selected source is contacted for each software component in succession for this purpose. In particular, an update therefore always comes from the network subscriber and not from the respective source, which means that an attack on the network subscriber is hampered. When an update is available for the respective software component, this update is preferably loaded, validated and performed by the source.

Advantageously, in the course of the update of the at least one software component, in particular after a successfully performed update, the component field associated with the at least one software component and/or the block field associated with the respective manufacturer-specific block is updated. After the update is performed, preferably the update-specific information of the respective software component is updated, in particular an identifier of this newest updated version of the software component is stored in the update-specific information.

Preferably, if a selected source is not available, a security measure is performed. This security measure can in particular ensure that no risk to the network subscriber arises as a result of an attack, since its program code cannot be updated. In particular, one such security measure is an error counter being incremented and/or the network subscriber being put into a safe state. In particular if the error counter reaches a limit value, the network subscriber is put into this safe state and, by way of example, isolated from the network in the process.

Advantageously, the program code is executed on a network subscriber configured as an Internet of Things device. An "Internet of Things" device (IoT device) of this kind is intended to be understood to mean in particular a device that is networked to other IoT devices of this kind via the network, in particular the Internet.

In particular, the IoT device may be configured as a sensor, an actuator, a controller or another machine component of a machine or installation, which is networked to other such machine components configured as IoT devices via the network, in particular the Internet, in particular in the course of what is known as "Industry 4.0".

Such a controller may be configured as a CNC (computerized numerical control) controller, NC (numerical control) controller, programmable logic controller (PLC) and/or motion logic controller (MC—motion control), for example.

The disclosure is suitable for a wide range of applications, for example for tunnel drilling machines, hydraulic punches/presses, general automation systems, semiconductor handling, robotics, etc. The method is particularly suitable for controllers of machines. A machine of this kind may in particular be configured as a machine tool, such as, for example, a welding system, a screw system, a wire saw or a milling machine, or as a web processing machine, such as e.g. a printing machine, a newspaper printing machine, an intaglio printing machine, a screen printing machine, an inline flexographic printing machine or a packaging machine. Such a machine may also be configured as a (belt) installation for manufacturing an automobile or manufacturing components of an automobile (e.g. internal combustion engines or controllers).

By way of example, the IoT device may also be configured as what is known as a "smart device", in particular as a portable handheld device, expediently as a touchscreen handheld device, e.g. as a smartphone or as a tablet PC.

The IoT device may in particular also be a domestic appliance in a private household that is networked to further IoT devices, for example a refrigerator, a washing machine, a television or an expedient home automation components, via the network, in particular the Internet.

A computation unit according to the disclosure, in particular a network subscriber of this kind or an IoT device of this kind, e.g. a controller of a printing machine, is designed, in particular by programming, to perform a method according to the disclosure.

Implementation of the method in the form of a computer program is also advantageous, since this results in particularly low costs, in particular if an executing controller is also used for other tasks and is thus present anyway. Suitable data storage media for providing the computer program are in particular magnetic, optical and electrical memories, such as e.g. hard disks, flash memories, EEPROMs, DVDs, among others. It is also possible for a program to be downloaded via computer networks (Internet, Intranet, etc.).

Further advantages and configurations of the disclosure are obtained from the description and the accompanying drawing.

It goes without saying that the features as cited above and those yet to be explained below are able to be used not only in the respectively indicated combination but also in other combinations or on their own without departing from the scope of the disclosure.

The disclosure is schematically depicted in the drawing on the basis of exemplary embodiments and is described in detail below with reference to the drawing.

DETAILED DESCRIPTION

Figure 1:
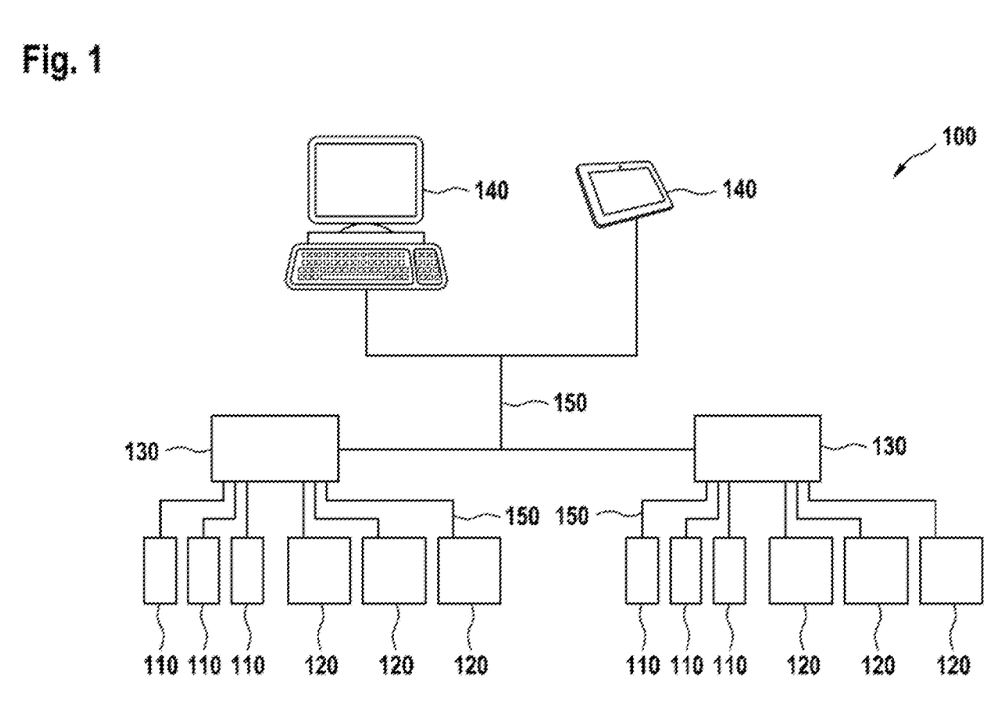
FIG. 1 schematically shows a machine with machine components configured as IoT devices that are each designed to perform a preferred embodiment of the method according to the disclosure.

FIG. 1 schematically depicts a machine, denoted by 100, that may be configured as a web processing machine, for example, for manufacturing and/or machining workpieces.

The machine 100 has a multiplicity of machine components, for example a multiplicity of sensors 110, a multiplicity of actuators 120 and a multiplicity of controllers 130, which may be configured as programmable logic controllers (PLC), for example. The controllers 130 may be connected to sensors 110 and can receive measured values from these sensors 110, and may additionally be connected to actuators 120 and can transmit actuation commands to these actuators 120. By way of example, these sensors 110 and actuators 120 can be used to move conveyor belts and to actuate robot-guided tools in order to machine workpieces moved on the conveyor belts.

These machine components 110, 120, 130 are configured as components on what is known as the field and control level, for example. Additionally, the machine 100 can have machine components 140 on what is known as the management level, for example computers or smart devices such as tablet PCs or smartphones.

These individual machine components 110, 120, 130, 140 are each configured as IoT devices and networked to one another via a network 150, for example the Internet. It goes without saying that the machine 100 may also have further machine components configured as IoT devices.

By way of example, this networking can be used to transmit measured values from the sensors 110 to a tablet PC 140 of an employee directly via the Internet 150. By way of example, the employee can use this tablet PC 140 to actuate the machine by e.g. inputting setpoint values that are transmitted via the Internet 150 to a PLC 130, which then actuates actuators 120 according to these input setpoint values.

Specific program codes can be executed on each of these IoT devices 110, 120, 130, 140. Since these IoT devices 110, 120, 130, 140 are connected to the Internet 150, it is important that the program code executed on the IoT devices 110, 120, 130, 140 regularly receives security updates and is up to date so that the machine does not become susceptible to attacks. Thus, the IoT devices 110, 120, 130, 140 are each designed to be updated within the scope of a preferred embodiment of a method according to the disclosure, as explained below on the basis of FIGS. 2 and 3.

Figure 2:
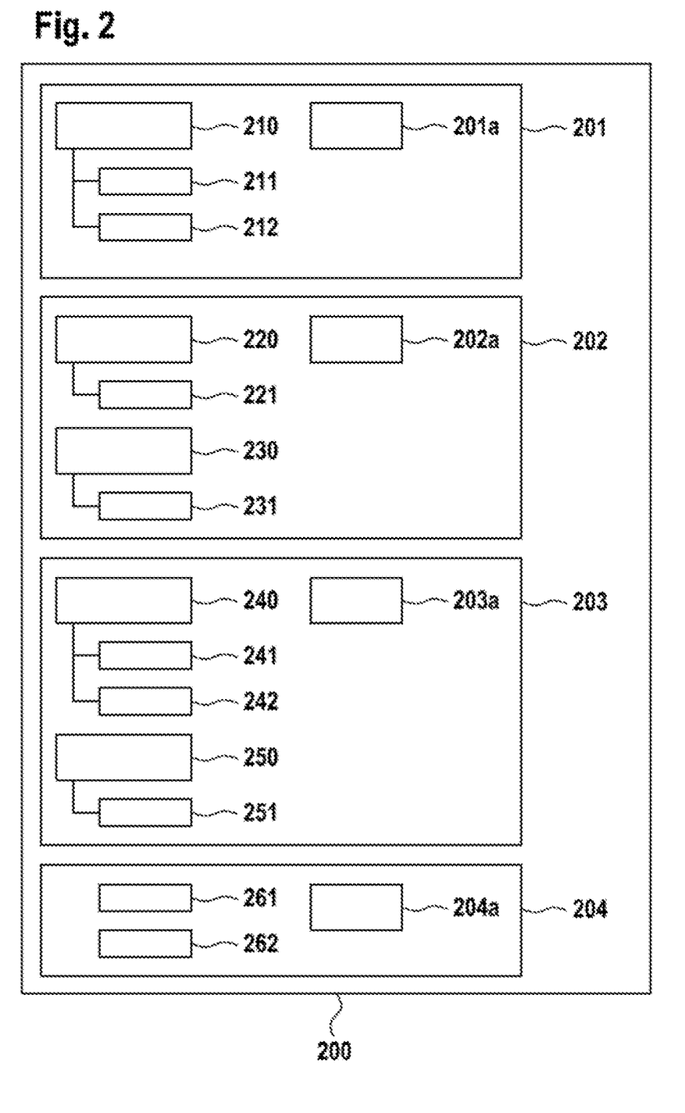
FIG. 2 schematically shows a program code designed to be updated within the scope of a preferred embodiment of a method according to the disclosure.

FIG. 2 schematically depicts a program code 200 that can be stored on and executed by one of the IoT devices 110, 120, 130, 140 from FIG. 1, for example.

The program code 200 is made up of a multiplicity of software components 210, 220, 230, 240, 250 that come from different manufacturers. The software components 210, 220, 230, 240, 250 are thus associated with manufacturer-specific blocks or areas 201, 202, 203, 204, depending on the manufacturer from which the software component 210, 220, 230, 240, 250 comes.

Each of these manufacturer-specific blocks 201, 202, 203, 204 has an associated block field 201a, 202b, 203c, 204d for what is known as a block-specific address or slot address. Additionally, the individual software components 210, 220, 230, 240, 250 have associated component fields 211, 212, 221, 231, 241, 242, 251, 261, 262, for what is known as a component address or component-specific address and for update-specific information.

On the basis of these block fields 201a, 202b, 203c, 204d and component fields 211, 212, 221, 231, 241, 242, 251, 261, 262 and the information stored therein, an update of the software components 210, 220, 230, 240, 250 is performed within the scope of a preferred embodiment of a method according to the disclosure, as described below with reference to FIG. 3.

Figure 3:
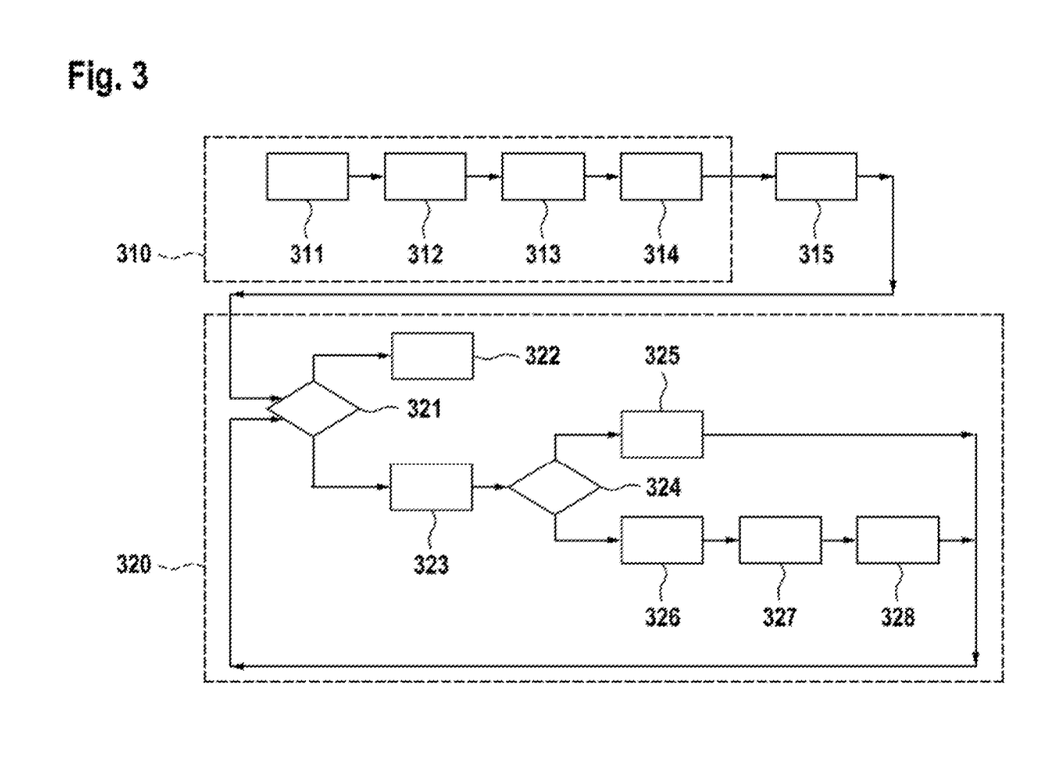
FIG. 3 schematically shows a preferred embodiment of a method according to the disclosure as a block diagram.

FIG. 3 schematically depicts a preferred embodiment of a method according to the disclosure as a block diagram.

Before the program code 200 is put onto the respective IoT device and executed by this IoT device at a second time 320, the program code is first of all produced in the course of a manufacturing process within the scope of a preferred embodiment of the method according to the disclosure.

At a first time 310, which is thus chronologically before the second time, step 311 involves a first software component 210 being produced as basic software by an original manufacturer of the program code, together with an applicable platform, for example. This first software component 210 is therefore associated with the slot 201 of the original manufacturer. At this first time 310, the manufacturer additionally assigns this first software component 210 two component fields 211 and 212 in step 312. The component field 211 is used by the manufacturer to store update-specific information providing details about a version of this software component 210. The component field 212 is used by the manufacturer to store an address of a source, e.g. of a cloud, that can perform updates of this software component 210 at the second time 320 after the program code 200 is started up. By way of example, the block field 201a remain empty in this case.

It is also conceivable for the program code to be produced not by the original manufacturer at the first time 310, but rather for a superordinate manufacturer (e.g. OEM) to extend an already existing program code at the first time. By way of example, in this case, a first OEM can obtain the basic software and the platform along with the first software component 210 from the manufacturer, and extend them with the software components 220 and 230, at the first time 310 in step 311. These software components 220 and 230 are therefore associated with the slot 202 of this first OEM. By way of example, the second software component 220 may have been produced by the first OEM itself, and the third software component 230 may have been obtained by the first OEM from a supplier, for example.

In step 312, the first OEM assigns the second software component 220 the component field 221 and uses the latter to store update-specific information providing details about the version of this software component 220, for example. Analogously, the third software component 230 is assigned the component field 231 and the latter is used to store update-specific information providing e.g. details about the version of this software component 230.

The first OEM can undertake the updates of these two software components 220 and 230 itself. Thus, the OEM uses the block field 201b to store an address e.g. of a cloud of the first OEM in step 312, which cloud performs updates of these two software components 220 and 230.

By way of example, this first OEM can likewise perform updates of the first software component 210 of the original manufacturer. Thus, the first OEM alters, in a step 313, the address stored in the block field 201a of this block 201 and erases said address or uses its own there.

Additionally, it is also conceivable for a further second OEM to obtain at the first time 310 the program code with the software components 210, 220 and 230 that has been extended by the first OEM and to extend it by further software components 240 and 250. In this case, the second OEM introduces these software components 240 and 250 into the program code at the first time 310 in step 311.

By way of example, this second OEM may have obtained this fourth software component 240 from a supplier and assigns this software component 240 the component fields 241 and 242 in step 312 in the slot 203 provided for it. The component field 241 is used by the second OEM to store update-specific information providing details about a version of the software component 240. By way of example, it is not the second OEM itself that can undertake the update of this software component 240, but rather the applicable supplier. In this case, the second OEM stores the address of the applicable source, e.g. the cloud of the supplier, in the component field 242 in step 312.

The fifth software component 250 may have been produced by the second OEM itself, for example, and the second OEM can also undertake the update of this fifth software component 250. The second OEM assigns the software component 250 the component field 251 in step 312 and uses the latter to store a version of the software component 250 as update-specific information. Additionally, the second OEM uses the block field 203a to store, in step 312, the address of the source, e.g. its own cloud, which undertakes the update of its own software component 250.

Additionally, the second OEM prescribes that component addresses in its block 203 have greater relevance than the slot address. Therefore, the component address stored in the component field 242, rather than the slot address, applies to the software component 240. Since the software component 250 does not have an associated component address, but the software component 240 does, the slot address stored in the block field 203a applies to the software component 250.

Alternatively, the second OEM could also prescribe that the slot address has greater relevance than the component addresses, for example. In this case, the slot address first of all applies to all software components 240, 250 of this slot 203. Only if this slot address has no update available for a software component is the component address selected for this software component.

The second OEM undertakes no updates of the other already available software components 210, 220 and 230 and thus leaves the already available block fields unaltered. Step 313 is thus not performed in this case.

After the second OEM has extended the program code and produced a final version of the program code 200, the program code can be loaded onto the respective IoT device in step 314. In particular, an end customer is able at this point to store further information in a slot 204 provided for it. By way of example, the end customer can use component field 261 to describe a version of the program code or properties of the IoT device and can use component field 262 to describe an interval of time after which, when it has elapsed, updates for the IoT device are meant to be sought. The block field 204a remains empty in this example.

After the program code 200 has been started on the IoT device in step 315, the IoT device has been introduced into the network 150 and networked to the further IoT devices 110, 120, 130, 140, and the prescribed interval of time has elapsed, updates for the program code 200 are sought at the second time.

In this case, a check is performed consecutively or in cascaded fashion at the second time 320 for each software component 210, 220, 230, 240, 250 in the program code 200, beginning with a hierarchically highest software component down to a hierarchically lowest software component, in each case on the basis of the respective block fields and component fields of the respective software component 210, 220, 230, 240, 250, to determine whether an update is available for the respective software component 210, 220, 230, 240, 250.

The hierarchically highest software components in this example can be regarded as the most recently introduced software components 240 and 250 of the second OEM.

Since the second OEM has prescribed that component addresses have greater relevance in its block 203 than the slot address, step 321 involves first of all checking whether component addresses are available for the software component 240 and 250, that is to say whether an address is stored in a component field. Since this is the case for the software component 240, the address stored in the component field 242 is selected and the applicable source or cloud of the applicable supplier is contacted. If the address is unavailable, an error counter is incremented in step 322 as a security measure. If the error counter then reaches a limit value, the program code 200 and hence the IoT device are disconnected from the Internet 150 and put into a safe state.

If the address or the cloud is available, however, a secure connection to the network address is set up in step 323 and the update-specific information of the component field 241 describing the current version of the software component 240 is transmitted to the cloud. The cloud then checks in step 324 whether an update is available for this version of the software component 240. If not, the cloud notifies the IoT device of this in step 325 and the secure connection is broken. If an update is available, however, it is transmitted to the IoT device in step 326, validated in said device and performed. After the update has been performed, the component-specific update-specific information in the component field 241 is updated in step 327 and the new version of the software component is recorded in said component field. The connection to the cloud is broken is in step 328.

Therefore, after all software components have been checked for which component addresses, that is to say component-specific information with network addresses stored therein, have been checked, the software components without such component addresses are now checked, namely the software component 250, and steps 321 to 328 are performed for the software component 250 analogously.

For this software component 250, the address stored in the block field 203a is selected in step 321 and the applicable source, e.g. the cloud of the second OEM, is contacted. Analogously to the description above, either an error counter is incremented in step 322 if the cloud does not respond or a secure connection is set up in step 323 and the component-specific information of the component field 251 is transmitted to the cloud. The cloud then checks in step 324 whether an update is available for this version of the software component 250. If this is the case, the update is performed in step 326, the component-specific information 251 is updated in step 327 and the connection to the cloud is broken in step 328.

As explained above, the second OEM could also have prescribed that in slot 203 the slot address has greater relevance than the component addresses. In this case, the slot address of the block field 302a is first of all selected for the software component 240 in step 321 and contacted. In particular, a secure connection to the cloud of this slot address is first of all set up and the update-specific information of the software component 240 is transmitted to the cloud. The cloud then provides notification that it is not responsible for the update of this software component 240 and no updates are available, and the secure connection is terminated. The component address stored in the component field 242 of the software component 240 is then selected and the update of the software component 240 is performed as explained above. Subsequently, the slot address is also selected for the software component 250 and this software component 250 is updated as explained above.

Therefore, after updates for the software components 240 and 250 of the slot 203 have been sought, the process is continued with the hierarchically next lower software components, namely with the software components 220 and 230 of the first OEM and of the slot 202.

Since only one address or slot address is stored in the block field 202a for these software components 220 and 230, this applicable address is selected in step 231 and the source, that is to say the cloud of the first OEM, is contacted.

Analogously to the description above, an error counter is incremented in step 322 if the cloud is not available at this network address. Otherwise, a secure connection is set up in step 323 and the component-specific information of the component field 231 of the software component 230 is first of all transmitted to the cloud, which checks in step 324 whether an update is available for this version of the software component 230. If this is the case, the update is performed in step 326 and the component-specific information of the component field 231 is updated in step 327. An analogous process is then performed for the software component 220. Subsequently, the secure connection is broken in step 328.

Subsequently, updates are sought for the hierarchically lowest software component 210. For this purpose, the address or component address stored in the component field 212 is selected in step 321 and the applicable source or cloud is contacted, which is the same source as has also been contacted for the software components 220 and 230, namely the cloud of the first OEM.

Analogously to the description above, an error counter is incremented in step 322 if the cloud is unavailable. Otherwise, a secure connection is set up again in step 323 and the component-specific information of the component field 211 is transmitted to the cloud. The cloud checks in step 324 whether an update is available for this version of the software component 210. If this is the case, the update is performed in step 326, the component-specific information 211 is updated in step 327 and the secure connection is broken in step 328.

As soon as the interval of time stored in the information 262 by the end customer has elapsed again, these aforementioned steps from the second time 320 are performed again and updates for the software component 210, 220, 230, 240, 250 are sought again.

What is claimed is:

1. A method for updating a plurality of software components of a network subscriber of a network, the network subscriber having program code that is executed by the network subscriber, the program code having at least two manufacturer-specific blocks, each of the plurality of software components belonging to one of the at least two manufacturer-specific blocks, each of the at least two manufacturer-specific blocks having a block field that is associated with all software components belonging to the corresponding manufacturer-specific block, each of the plurality of software components having a component field that is uniquely associated with the corresponding software component, the method comprising:

storing, for each respective software component in the plurality of software components, at least one address of at least one source responsible for updating the respective software component in at least one of (i) the block field of the manufacturer-specific block to which the respective software component belongs and (ii) the component field of the respective software component; and updating each respective software component in the plurality of software components in an order corresponding to a hierarchy of the plurality of software components, in each case by:

selecting a source to be used to update the respective software component based on the block field of the manufacturer-specific block to which the respective software component belongs and the respective associated component field of the respective software component, the source being selected according to an address stored in the component field of the respective software component in response to the address being stored in the component field of the respective software component, the source being selected according to an address stored in the block field of the manufacturer-specific block to which the respective software component belongs in response to the component field of the respective software component not storing any address; and updating the respective software component with aid of the selected source.

2. The method according to claim 1, the storing further comprising:
during a manufacturing process, before the program code is introduced into the network subscriber, storing, for at least one respective software component in the plurality of software components, the at least one address of the at least one source in the at least one of (i) the block field of the manufacturer-specific block to which the respective software component belongs and (ii) the component field of the respective software component.

3. The method according to claim 2, the storing further comprising:
during a manufacturing process, before the program code is introduced into the network subscriber, storing, for respective software components in the plurality of software components belonging to an alien manufacturer-specific block, the at least one address of the at least one source in the block field of the manufacturer-specific block to which the respective software component belongs.

4. The method according to claim 1, wherein the component field of each of the plurality of software components stores update-specific information about a current version of the respective software component.

5. The method according to claim 4, the updating further comprising:
updating the respective software component with aid of the selected source based on the update-specific information stored in the component field of the respective software component.

6. The method according to claim 1, the updating further comprising:
updating at least one of the component field of the respective software component and the block field of the manufacturer-specific block to which the respective software component belongs in the course of updating of the respective software component.

7. The method according to claim 1, further comprising:
performing a security measure in response to the selected source being unavailable,
wherein the security measure includes at least one of incrementing an error counter and putting the network subscriber into a safe state.

8. The method according to claim 1, further comprising:
executing the program code on a network subscriber configured as an Internet of Things device.

9. The method according to claim 1, wherein a processor is configured to perform the method.

10. The method according to claim 9, wherein a computer program prompts the processor to perform the method when the computer program is executed on the processor.

11. The method according to claim 10, wherein a non-transitory machine-readable storage medium stores the computer program thereon.

12. A method for updating a plurality of software components of a network subscriber of a network, the network subscriber having program code that is executed by the network subscriber, the program code having at least two manufacturer-specific blocks, each of the plurality of software components belonging to one of the at least two manufacturer-specific blocks, each of the at least two manufacturer-specific blocks having a block field that is associated with all software components belonging to the corresponding manufacturer-specific block, each of the plurality of software components having a component field that is uniquely associated with the corresponding software component, the method comprising:
storing, for each respective software component in the plurality of software components, at least one address of at least one source responsible for updating the respective software component in at least one of (i) the block field of the manufacturer-specific block to which the respective software component belongs and (ii) the component field of the respective software component; and
updating each respective software component in the plurality of software components in an order corresponding to a hierarchy of the plurality of software components, in each case by:
selecting a source to be used to update the respective software component based on the block field of the manufacturer-specific block to which the respective software component belongs and the respective associated component field of the respective software component, the source being selected according to an address stored in the block field of the manufacturer-specific block to which the respective software component belongs in response to an update being available for the at least one software component at the address stored in the block field of the manufacturer-specific block, the source being selected according to an address stored in the component field of the respective software component in response to an update not being available for the at least one software component at the address stored in the block field of the manufacturer-specific block; and
updating the respective software component with aid of the selected source.

* * * * *